No. 737,623. PATENTED SEPT. 1, 1903.
J. HEDLUND.
SHAFT SHIELD FOR CENTRIFUGAL PUMPS.
APPLICATION FILED JUNE 27, 1902.
NO MODEL.

WITNESSES:
J. A. Van Wart
A. Henderson.

INVENTOR
Johan Hedlund
BY Park Benjamin
his ATTORNEY

No. 737,623. Patented September 1, 1903.

UNITED STATES PATENT OFFICE.

JOHAN HEDLUND, OF STOCKHOLM, SWEDEN.

SHAFT-SHIELD FOR CENTRIFUGAL PUMPS.

SPECIFICATION forming part of Letters Patent No. 737,623, dated September 1, 1903.

Application filed June 27, 1902. Serial No. 113,520. (No model.)

*To all whom it may concern:*

Be it known that I, JOHAN HEDLUND, a subject of the King of Sweden and Norway, and a resident of Stockholm, Sweden, have invented a new and useful Improvement in Shaft-Shields for Centrifugal Pumps, of which the following is a specification.

The invention relates to centrifugal pumps, and has for its object the protection of that part of the wheel-shaft which is located between the wheel and the pump-casing from wear due to abrasive or destructive materials in the liquid or to friction.

My invention consists in a detachable sleeve constructed to inclose and so protect that portion of the shaft which extends between the wheel and the casing and more particularly in the construction hereinafter set forth.

Figure 1:
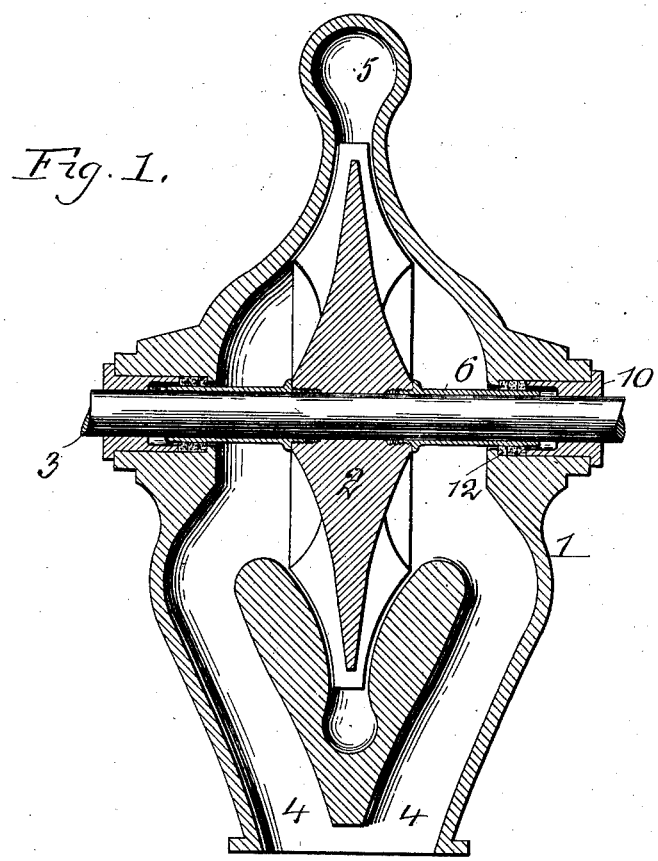
Figure 2:
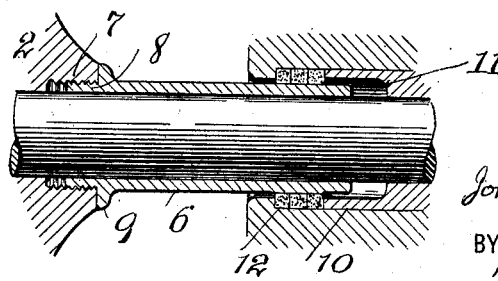

In the accompanying drawings, Figure 1 is a transverse section of a centrifugal pump containing my invention. Fig. 2 is a similar section of my invention on a larger scale than appears in Fig. 1.

Similar numbers of reference indicate like parts.

1 is the pump-casing, 2 the pump-wheel, and 3 the pump-shaft carrying the wheel 2. The liquid-inlets are at 4 and the discharge at 5. The hub of the pump-wheel 2 has an internally-threaded recess 7, which receives the threaded end 8 of the sleeve 6. Said end is provided with a flange 9, which abuts against the end of the wheel-hub. In the wall of casing 1 is an opening which receives the gland 10, which gland has a hollowed-out face 11. When said gland is in place, the opening on the inside of the casing and the hollow in the inner face of the gland together form a recess larger in diameter than the shaft 3. Said shaft passes through the gland 10, which gland becomes practically a part of the casing-wall. The sleeve 6 projects into and terminates in the recess aforesaid. Between the end of the gland and a shoulder formed in the said recess packing 12 is placed, which packing surrounds the sleeve 6 and forms a bearing therefor and also prevents flow of liquid around said sleeve to the hollow in the gland-face. By this construction the sleeve 6 serves as a shield for the shaft to prevent contact therewith of liquid traversing the pump-chamber.

I claim—

1. The combination of a wheel, a casing having an inwardly-opening recess in its wall, a shaft carrying said wheel and extending into and through said recess, a sleeve inclosing said shaft and secured at one end to said wheel and terminating at its other end in said recess and a bearing for said sleeve in said recess, substantially as described.

2. The combination of a wheel, a casing having an inwardly-opening recess in its wall, a shaft carrying said wheel and extending into and through said recess, a sleeve inclosing said shaft and secured at one end to said wheel and terminating at its other end in said recess and packing within said recess surrounding said sleeve, substantially as described.

3. The combination of the casing 1 having an internally-shouldered opening in its wall, wheel 2, gland 10, shaft 3 extending through said gland, sleeve 6 inclosing said shaft, abutting at one end against said wheel and terminating at its other end in said recess, and packing 12 surrounding said sleeve and interposed between said shoulder in said casing-opening and said gland, substantially as described.

4. The combination of a wheel, a shaft carrying said wheel, a casing, a sleeve inclosing said shaft and extending between said wheel and said casing, a bearing for said sleeve in said casing, and means for detachably connecting said sleeve to said wheel, substantially as described.

5. The combination of a wheel having a central recess in its body portion, a shaft carrying said wheel, a casing, a sleeve inclosing said shaft, and a bearing for said sleeve in said casing; the said sleeve having one end received in said bearing and its other end entering and detachably secured in said wheel-recess, substantially as described.

6. The combination of a wheel having a central threaded recess in its body portion, a shaft carrying said wheel, a casing, a sleeve inclosing said shaft and having a threaded end to engage in said wheel-recess, and a bearing for said sleeve in said casing, substantially as described.

In testimony whereof I have signed my name to this specification in the presence of two subscribing witnesses.

JOHAN HEDLUND.

Witnesses:
WALDEMAR BOMAN,
H. RIDDERSTOLPE.